US005730654A

United States Patent [19]
Brown

[11] Patent Number: 5,730,654
[45] Date of Patent: Mar. 24, 1998

[54] MULTI-PLAYER VIDEO GAME FOR HEALTH EDUCATION

[75] Inventor: Stephen J. Brown, Mountain View, Calif.

[73] Assignee: Raya Systems, Inc., Mountain View, Calif.

[21] Appl. No.: 573,629

[22] Filed: Dec. 18, 1995

[51] Int. Cl.$^6$ .................................................. A63F 9/22
[52] U.S. Cl. ........................... 463/1; 463/7; 434/127; 434/262
[58] Field of Search .................. 463/1, 7, 9; 364/410, 364/413.01, 413.29; 434/127, 262

[56] References Cited

U.S. PATENT DOCUMENTS

| | | | |
|---|---|---|---|
| 4,738,451 | 4/1988 | Logg | 463/15 |
| 5,035,625 | 7/1991 | Munson et al. | 463/9 |
| 5,307,263 | 4/1994 | Brown | 364/413.09 |
| 5,678,571 | 10/1997 | Brown | 128/895 |

OTHER PUBLICATIONS

M.U.L.E. rulebook by Electronic Arts, 1983.
Gauntlet (for PC) rulebook by Mindscape Inc. (Gauntlet by Apple);1985.

*Primary Examiner*—Jessica Harrison
*Attorney, Agent, or Firm*—Lumen Intellectual Property Services

[57] ABSTRACT

A multi-player video game for health education encourages inter-player communication about a health condition by correlating the players' progress. Each player manages the health of a game construct such as a game character or body region. Correlating the player's game progress is achieved through: common scoring; conditioning a player's passage to higher levels on the health management success of all players; and common game resources, including game resources representing devices or supplies used in the care of the health condition. Applications include children' health education related to diseases such as diabetes and asthma, as well as health habits such as dental hygiene, and tobacco, alcohol and drug use.

38 Claims, 5 Drawing Sheets

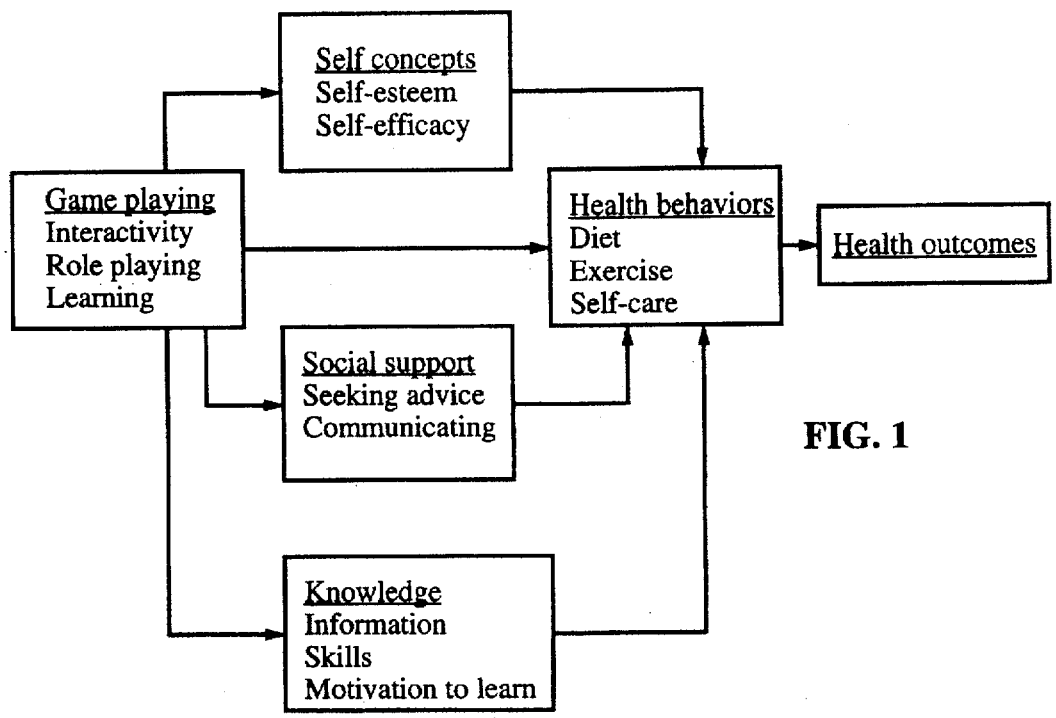
FIG. 1
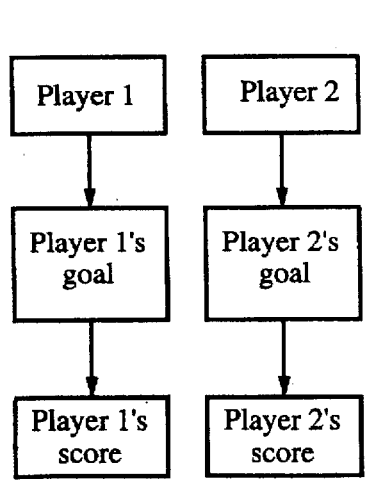
FIG. 2-A
PRIOR ART
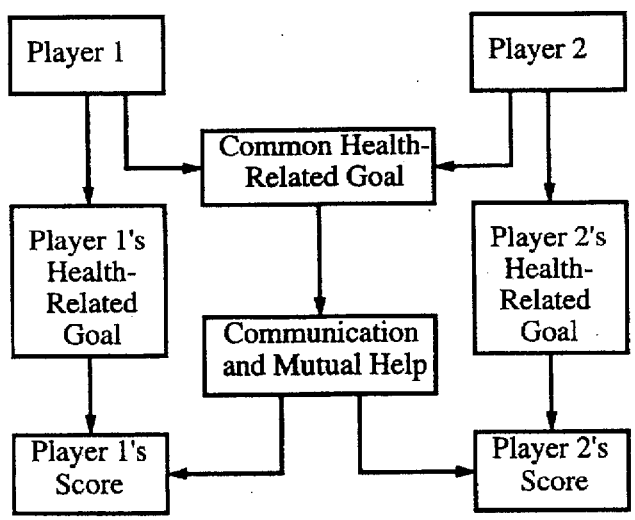
FIG. 2-B

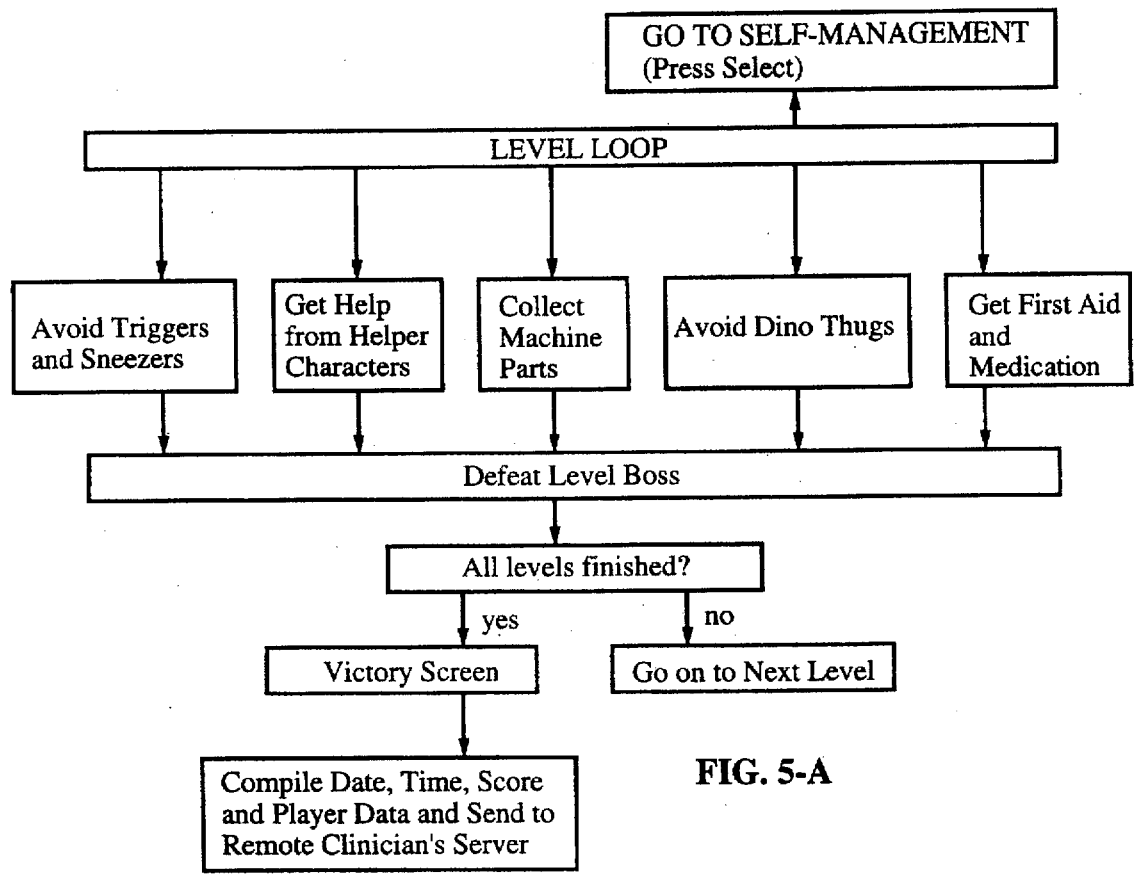
FIG. 5-A
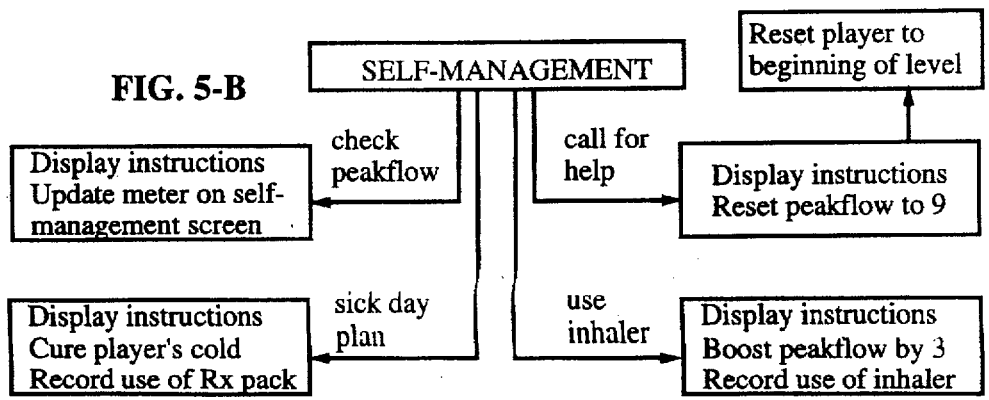
FIG. 5-B

|  | Player 1's choice | |
|---|---|---|
|  | Cooperate | Betray |
| Player 2's choice Cooperate | Player 1 gets X points<br>Player 2 gets X points | Player 1 gets A points, A>X<br>Player 2 gets B points, B<X |
| Betray | Player 1 gets B points, B<X<br>Player 2 gets A points, A>X | Player 1 gets Y points, Y<X<br>Player 2 gets Y points, Y<X |

FIG. 6

MULTI-PLAYER VIDEO GAME FOR HEALTH EDUCATION

BACKGROUND—FIELD OF THE INVENTION

The present invention relates to the field of Children's health education, and in particular to a method of health education using an interactive multi-player video game.

BACKGROUND—DESCRIPTION OF PRIOR ART

In the treatment and prevention of chronic medical conditions, it is often very important to instill in the patient healthy habits that the patient will maintain over the long term. Also, the patient needs to be informed about his or her condition. Moreover, it is often useful for the patient to have social interactions and discussion health and self-care. Thus, three major goals of health education are: habit formation, communication of knowledge, and provision of social support.

Traditional methods of health education include classroom instruction, showing films, and providing to patients. While these methods may provide a large amount of didactic content, they are not especially well suited for habit formation and for providing social support.

OBJECTS AND ADVANTAGES OF THE INVENTION

Interactive video games offer some unique advantages over conventional methods of health education for young people. Video game playing is highly appealing to children and adolescents. About 70% of U.S. homes with children have video game systems, and children who own them spend an average of 1.5 hours playing video games each day. The hardware is inexpensive, sturdy and easily portable in comparison to other multimedia technologies. Moreover video games have interactive capabilities that lend themselves well to experiential learning. While pamphlets, films, or traditional classroom instruction may provide more didactic content, a compelling video game can expose children to essential content repeatedly, as many children will typically play a game they like for at least a month or two for dozens of hours. Also, playing video games with can encourage children to talk about health topics and an serve as springboards for discussion with friends, family and health care providers about sensitive topics.

Thus, it is a primary object of this invention to provide a method that facilitates social interaction and discussion about health and self-care. It is another object of this invention to provide a method of health education that is particularly suited to habit formation in young people. These and other objects and advantages will become more apparent after consideration of the ensuing description and the accompanying drawings.

SUMMARY OF THE INVENTION

The objects and advantages of the invention achieved with a method of health education using a multi-payer video game. The method induces cooperation and discussion between the game players by correlating the players' progress toward achieving their game objectives. The correlation of the players' progress can be achieved through the use of common resources by the players; in particular, in embodiments of the current invention, improper health behavior by a player negatively affects some of the common resources. The correlation can also be achieved by assigning the players to defend from disease a game domain, such as a region of the body. The correlation can also be achieved through the use of a scoring system based on the Prisoner's Dilemma.

BRIEF DESCRIPTION OF THE DRAWINGS

FIG. 1 shows schematically the mediating factors that are used to influence health behavior in the method of the current invention.

FIG. 2-A is a flowchart diagram showing the relationship between players' goals and scores in a typical video game.

FIG. 2-B is a flowchart diagram showing the relationship between players' goals and scores in a video game of this invention.

FIG. 5-A shows a simplified flowchart of a level loop for Bronkie the Bronchiasaurus®.

FIG. 5-B shows a flowchart of the self-management loop for Bronkie the Bronchiasaurus®.

FIG. 6 shows a payoff matrix for a two player Prisoner's Dilemma.

DESCRIPTION

Figure 3:
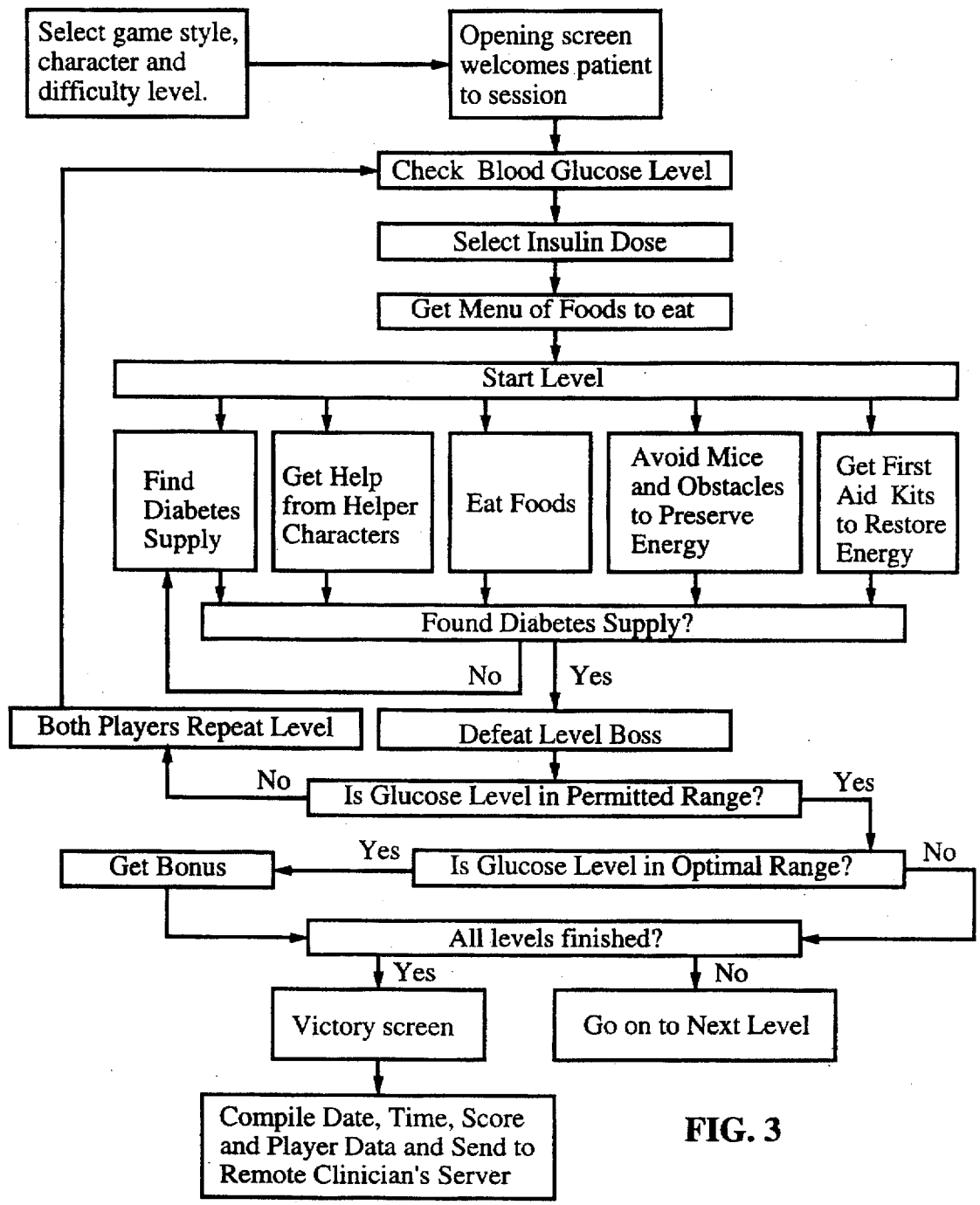
FIG. 3 is a flowchart for Packy and Marlon™, an embodiment of the present invention.

The present description discloses the goals and design strategies that are incorporated into Health Hero® video game series, and in particular into the games Packy and Marlon™ and Bronkie the Bronchiasaurus®.

FIG. 1 shows schematically the mediating factors that are used to influence health behavior in the Health Hero® video game series. The games use self-concepts, social support, and knowledge as mediating factors for influencing health behaviors and outcomes.

The present invention focuses on the use of social support to affect health behavior. Details on the use of the other mediating factors can be found in U.S. Pat. No. 5,678,571, filed May 23, 1994.

A health oriented video game has the potential to stimulate discussion with friends, family and clinic about a health issue; help children to talk about their own condition with others when they otherwise might try hide it; and encourage them to seek support and advice. a video game can motivate children to learn and enhance their attitudes about learning. The motivational aspects of video games are valuable for health education because children are not always interested in learning about self care.

Cooperation and discussion between game players is enhanced if the outcomes of the player's actions are correlated. FIG. 2-A and 2-B show flowchart diagram for a typical video game and for a video game in which a player's performance depends on other players' actions. In a competitive multi-player game the players are not encouraged to communicate, since their performance in the game depends largely on their own abilities. In a game where the performances of the players are correlated, the players are more likely to communicate.

Packy and Marlon™, a Super Nintendo video game for ages 8 to 15, features two elephant pals and their at diabetes summer camp. The game helps players learn about diabetes self-care and how to deal with social situations that often confront young people with diabetes. The game objective for the two elephant buddies is to save the diabetes summer camp Wa-kee from bands of pesky rats and mice that have attacked the camp, scattered food all over the campground, and hidden the diabetes supplies. To attain the game objective, the two buddies also have to attain health-related goal: they must manage their diabetes carefully along the way, making sure they eat properly and take correct insulin amounts.

The elephants' adventure takes four game days, each day reflecting a typical diabetes meal plan from breakfast to bedtime snack. Each game day is divided into seven levels, each level corresponding to a meal or snack. The players must: choose an insulin plan (fixed or variable dose, two or four shots per day); frequently monitor and respond to changes in blood glucose levels; select the correct dose and then take insulin; review meal plans and a Food Chart to select foods to eat; learn how to vary meal plans with food exchanges; review a Logbook; and learn basics of diabetes self-care and how to handle typical social situations.

A simplified flow chart for Packy and Marlon™ is shown in FIG. 3. Players must check their elephants' glucose level before each level, i.e. seven times in a game day. The elephants' blood glucose level is affected by what they eat and by how much insulin they take. Players earn points for keeping the elephants' blood glucose within a normal zone. The more times in a row they keep the blood glucose level within the normal zone, the bigger the bonus. At the beginning of each adventure level is a menu of foods for Packy and Marlon's next meal or snack. Players review the menu to know what foods to select or food exchanges to substitute in the upcoming level. Players can choose foods from all food groups: bread, fruit, meat, milk, vegetable and fat.

A color coded information bar at the top of the screen tells players how many foods they have selected within each food group and whether they have eaten the right amount. A yellow number shows players that they can select more foods in that food group. A green number means they have selected just the right amount of food. A red number warns players that they have selected too many foods. To help players make smart food choices, players can pull up, at any time, a Food Chart listing the food groups for each food that appears in the game.

In order to monitor how well they've managed Packy and Marlon's diabetes, players can review at any time a Logbook showing a record of the elephants' blood glucose levels, amount of insulin taken, and the number of foods that were eaten from each food group. The Logbook presents the same kinds of information that children with diabetes are often asked to record each day in a notebook for their doctor to review during routine visits.

The game provides challenging questions about diabetes in each adventure level. The questions pop up when the elephants bump into friendly characters along their way. Players earn points for answering questions correctly and every time they answer three questions correctly they win an extra life.

To win Packy and Marlon™ it's not enough for players to demonstrate superior game play such as finding the diabetes supply; taking advantage of power-ups and pick-ups; finding their way in each adventure level; avoiding obstacle like a spike, crab or cactus; fending off mice; and defeating the ultimate boss. Players must also carefully manage Packy and Marlon's diabetes by helping the heroes monitor their blood glucose, take the right amount of insulin, and eat a healthy and balanced diet along the way. Thus, Packy and Marlon™ helps children learn about diabetes by incorporating in the game information about the condition. The game also helps the children develop proper habits for the management of their condition, such as eating properly, taking correct amounts of insulin, and keeping a Logbook. Moreover, the game also encourages social interaction and communication between the two children playing the game by correlating their performance in the game.

The correlation between the performances of the two partners is achieved in several ways. Firstly, the screen is centered around one of the elephants; therefore, the other elephant has to stay relatively close to the first elephant. Secondly, the two elephants have to use common resources such as food and first aid kits. If one of the elephants eats too much food, not only will his blood glucose level become too high, but the other elephant will not find enough to eat and consequently have a low level of blood glucose. So, improper health behavior, such as eating too much, by one of the players negatively affects the common resource (food). Moreover, if any one of the elephants has a very low or very high blood sugar level at the end of a level, both elephants have to repeat the level.

It is clear that in order to correlate the progress of the two players in the game, one can use interrelated resources rather than common resources. For example, one can conceive of a game where if a player used too much water, he or she might kill the plants the other player eats, which in turn may affect the first player's water supply.

Figure 4:
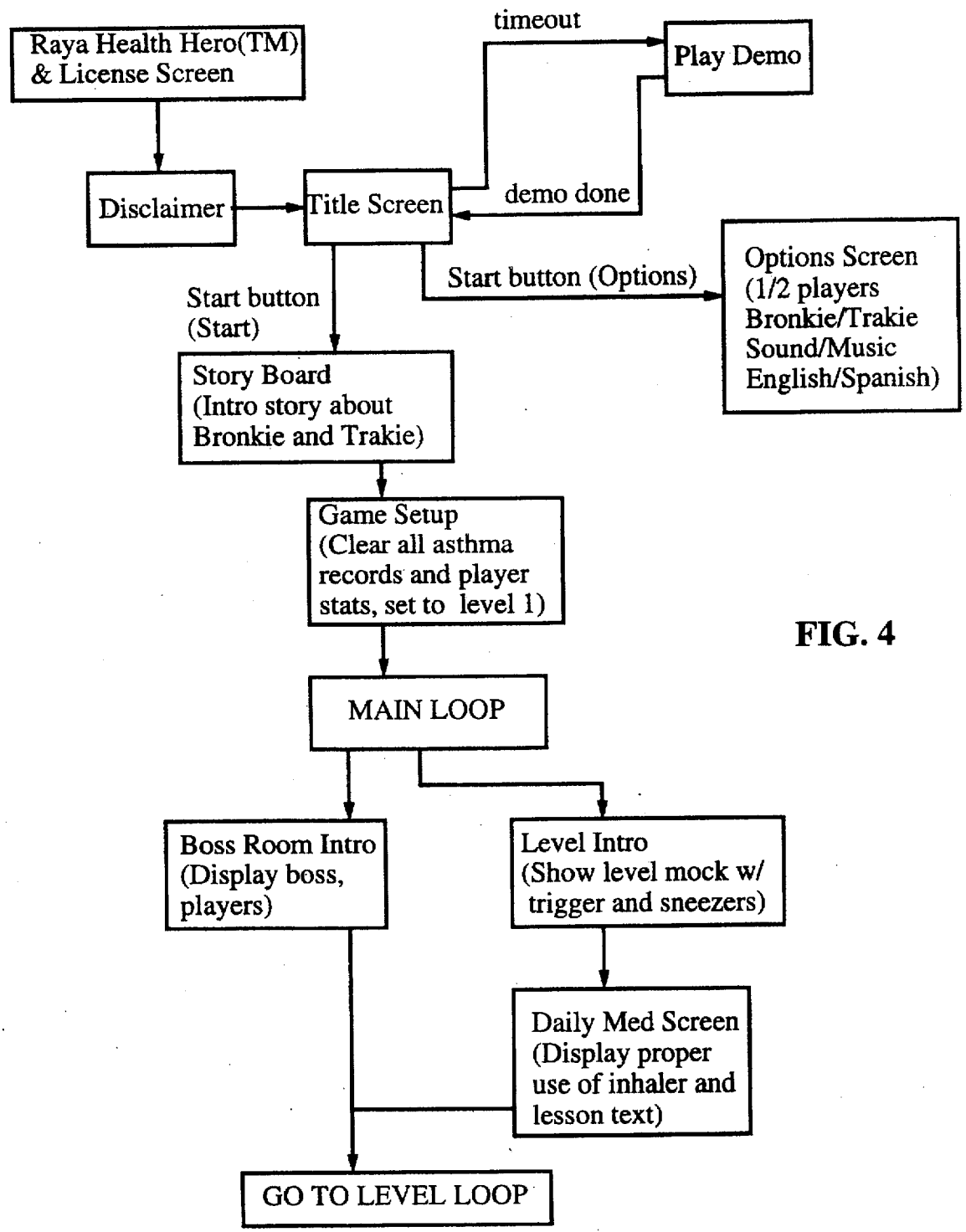
FIG. 4 shows a flowchart including the main loop for Bronkie the Bronchiasaurus®, another embodiment of the present invention.

Another game in the Health Hero® series is Bronkie the Bronchiasaurus®, a game teaching asthma self-management to children ages 7 to 15. A flow chart including the main loop of the game is shown in FIG. 4, while a flow chart including a level loop is shown in FIG. 5-A. In the game, the two dinosaurs Bronkie the Bronchiasaurus and Trakie the Tracheratops must find the parts of machine that clears dust from the air, and put the machine together. Along the way, the two dinosaurs have to avoid the many asthma triggers they encounter and make sure their peak flow stays high. Only if their peak flow is high can the dinosaurs use their strongest defense—the breath blast. On their adventure, players learn about: taking daily medication; using an inhaler and spacer; avoiding asthma triggers; monitoring and responding to changes in peak flow; using a sick day plan appropriately; reviewing an Asthma Record; and basics of asthma care.

At the beginning of each adventure level, Bronkie and Trakie take their daily asthma medicine and show players how to use an inhaler and spacer correctly. Players also see information about asthma care to help them answer questions that appear in the upcoming adventure level. Asthma questions pop up when Bronkie or Trakie bump into one of the Helper characters. Players who answer a question correctly receive assistance with navigation, such as free ride over a deep chasm, or receive a machine piece that is essential to win the game. Players who answer a question incorrectly must find the Knowallosaur Hazel, who gives them the information they need to come up with the right answer next time.

The biggest challenge in the game is to stay away from the many asthma triggers that surprise the dinosaurs along the way. Players must make sure that Bronkie and Trakie do not bump into anything that will lower their peak flow, including the ubiquitous Sneezers who spray virus-laden sneeze droplets that make the dinosaurs catch a cold. Stoplights at the top of the screen show the current peak flow for each dinosaur. A green light signals that flow is fine, yellow indicates that peak flow has dropped a few notches and emergency medication is advised, and red means peak flow is so low that Bronkie or Trakie must use emergency medication or call for help. As peak flow goes down, the dinosaurs start to cough and the picture gradually darkens until it is impossible for players to see the game.

To manage the dinosaurs' asthma, players can pull up the Asthma Management screen and choose among several options: test peak flow, use an emergency inhaler, follow the sick day plan, or call for help; a player can call for help only if peak flow is in the red zone. A flow-chart of the asthma self-management loop of the game is shown in FIG. 5-B. The game keeps track of all the choices the players have made and displays them in the Asthma Record that appears at the end of each adventure level.

Players earn points for making appropriate asthma management decisions and answering questions about asthma properly. To receive a special bonus, players must manage Bronkie or Trakie's asthma perfectly by avoiding all asthma triggers, keeping peak flow constantly in the green zone, and answering asthma questions correctly the first time.

Like Packy and Marlon™, Bronkie the Bronchiasaurus® is at the same time a tool for learning, habit formation and for facilitating social interaction and discussion about health issues. The performances of the two players are correlated through the link between their health and the brightness of the game image. For example, if one player fails to avoid allergens or to take medication, the screen becomes darker. The other player's performance in the game is evidently affected by the brightness of the screen.

Another embodiment of the present invention in which the actions of the game players are correlated is a game in which the two players defend a game domain such a region of the body from disease or from a disease factor. In such a game, the game domain can be a human mouth or a region of the mouth, and the disease factor can be plaque or cavities.

Setting a common goal, such as maintaining good health, is a particular way of correlating the outcomes of two players' actions in order to encourage cooperation and communication between the players. Another unique way of correlating the outcomes of the actions of two or more players is based on what is generally known as the Prisoner's Dilemma.

In the classic version of Prisoner's Dilemma, a player makes a choice between two options, which can be called cooperation and betrayal. The outcome of a player's choice depends on the choices made by the other players. The first player does not have any information about the choices made by other players. FIG. 6 shows the dependence of outcomes on choices for a two-player Prisoner's Dilemma, where the outcomes are measured as scores. More generally, the outcomes are rewards; a reward can be, among others a score, or additional time to play the game, or a power-up that facilitates progress in the game. The paradox the dilemma is that for a single round, it is a priori more advantageous for player 1 to choose the second option (betray), regardless of the choice made by player 2. However, over the long term the two players achieve the highest total score if they both choose the first option (cooperate), assuming A+B<2X, where A and B and X are the rewards shown in FIG. 6. If both players cooperate, they each get an amount X; if both betray, they each get Y, Y<X; and if player 1 cooperates but player 2 betrays, player 1 gets B, B<X, while player 2 gets A, A>X. If A+B<2X, then the total of the two players' scores is highest when they both cooperate. In a simple embodiment, one can choose X=1, Y=B=0, and A to be a number between 1 and 2, e.g. A=1.5; the higher the value of A, the larger the reward for betrayal. Another possibility is, for example, X=3, B=0, Y=1 and A=5.

The classic description of the Prisoner's Dilemma, as presented above, explicitly and directly correlates the outcome one a choice made by player 1 with the corresponding choice made by player 2. A less direct way of correlating the outcomes of the choices made by the two players through the use of a common game resource, such as the time available to the players to play the game. The reward $R_q$ obtained by a player Q depends on the common game resource. A payoff matrix is not particularly well suited for the description of such a model; instead, the model can be described through the effect of the choice made by player Q on the common game resource. Player Q makes a choice between a team-oriented option and a self-oriented option. The total reward $R_t$, i.e. the sum of the rewards of the two players, is at least as large if player Q chooses the team-oriented option as it is if player Q chooses the self-oriented option. At the same time, the share $S=R_q/R_t$ of the total received by player Q is at least as large if player Q chooses the self-oriented option as it is if player Q choose the team-oriented option. For two players, the above description is equivalent to the description based on the payoff matrix shown in FIG. 4, with A+B<2X.

An example of a health education game based on the Prisoner's Dilemma is one in which two or more players are assigned to defend a game domain from disease. In such an embodiment, two players try to remove plaque from a human heart. A player gets points based solely on the amount and not the type, of plaque that he or she removes; however, older plaque is harder to remove than newer plaque. So over the short term, it is more advantageous for a player to focus on removing new plaque. However, accumulation of old plaque causes vital arteries or veins to close, which in turn leads to a heart attack. So a player focusing on removing old plaque will prolong the life of the heart, but will get less points than a player focusing on the removal of new plaque. Other similar games include games in which players remove smoking-caused precancerous cells from the respiratory system, or plaque or cavities from a human mouth.

There are many ways to generalize the Prisoner's Dilemma to more than two players. An element of such a generalization is that given a predetermined set of choices made by all players but a player Q from a set of P players, the score of player Q is at least as high if player chooses the second option (betrayal) as if player Q chooses the first option (cooperation). A second element is that for a given choice made by player Q, the score of player Q will have a highest value A if all players other than Q choose the first option, and the score of player Q will be lower than A if at least some of the players other than player Q choose the second option. The essential point is that, for a given set of choices made by all players other than Q, if player Q chooses the second option the score of player Q will be higher and the other players' scores will be lower than if player Q had chosen the first option; that is, a player choosing the second option increases his or her score at the expense of the other players.

One of the many ways to implement of multi-player Prisoner's Dilemma game is to assign a factor b>1 for betrayal (second option) and a factor c<1 for cooperation (first option). Then the score of a player Q from a set of P players can be chosen to be: X if all players cooperate; Xb if only player Q betrays; $Xc^n$ if player Q cooperates but in other players betray; and $Xbc^n$ if player Q betrays and n other players betray.

A similar way to implement a Prisoner's Dilemma game is to assign to betrayal a probability T that all score: for that round will be zero. In such an arrangement, a player choosing the second option (betrayal) will increase his or her score by a factor b>1 if the round is not voided but at the same time will increase by T the probability that the round is voided. T can be chosen to be 1/P for example, where P is the number of players.

Another particular way to implement the Prisoner's Dilemma for multiple players is to add the scores obtained by a player Q against each of the other players according to the payoff matrix shown in FIG. 4. That is, the multi-player game is treated as a sum of two-player games between all possible combinations of players.

SUMMARY, RAMIFICATIONS, AND SCOPE

It is clear that there are many ways to induce cooperation and discussion between players by correlating the players' progress in the game. Correlating the players' progress can be achieved through the use of common resources by the players, or through the use of a scoring system based on the Prisoner's Dilemma, among other methods. A score is merely a convenient example of a reward; other rewards can be used instead or in combination with a score in a method of the present invention. A method of the present invention can be used for health education about a wide range of diseases and habits, such as cystic fibrosis, AIDS, sickle cell anemia, eneuresis, cancer, proper nutrition, tobacco use, drug use, and alcohol use. Therefore, the scope of the invention should be determined, not by the examples given, but by the appended claims and their legal equivalents.

I claim:

1. A method using a multi-player video-game for providing health education and encouraging communication about a health condition, comprising the steps of:
   a) setting a first video game objective for a first player, and a second video game objective for a second player, said first objective comprising a first health-management game goal for said health condition, said second objective comprising a second health-management game goal for said health condition; and
   b) encouraging communication between said first player and said second player about said health condition by correlating a progress of said first player toward attaining said first objective with a progress of said second player toward attaining said second objective.

2. The method of claim 1 wherein said health condition comprises diabetes.

3. The method of claim 1 wherein said health condition comprises asthma.

4. The method of claim 1 wherein said health condition is selected from cystic fibrosis, AIDS, sickle cell anemia, eneuresis, and cancer.

5. The method of claim 1 wherein said health condition is selected from dental disease and decay, eating disorders, improper nutrition, tobacco use, drug use, and alcohol use.

6. The method of claim 1 wherein:
   a) said first health-management goal comprises managing a health of a first game character subject to said health condition; and
   b) said second health-management goal comprises managing a health of a second game character subject to said health condition.

7. The method of claim 6 wherein:
   a) said health condition comprises diabetes; and
   b) said first health-management goal is selected from a group of ensuring that said first game character takes appropriate insulin doses, and ensuring that said first game character eats appropriate amounts of food, for maintaining a blood glucose level of said first game character in a desired range.

8. The method of claim 6 wherein:
   a) said health condition comprises asthma; and b) said first health-management goal is selected from a group of ensuring that said first game character avoids allergens, and ensuring that said first game character takes appropriate asthma medications, for maintaining a peak flow of said first game character in a desired range.

9. The method of claim 6 wherein said first health-management goal comprises controlling said character to respond to game challenges representative of said health condition.

10. The method of claim 1 wherein said first health-management goal comprises managing a health of a game body region affected by said health condition.

11. The method of claim 10 wherein said game body region is selected from mouth and cardiovascular regions.

12. The method of claim 1 further comprising a step of asking said first player a question related to said health conditions, wherein correctly answering said question by said first player advances said progress of said first player.

13. The method of claim 1 comprising achieving said correlating by making said progress of said first player and said progress of said second player depend on a set of common game resources.

14. The method of claim 13 wherein said set of common game resources comprises a resource used in a care of said health condition.

15. The method of claim 13 wherein said resource comprises a medical device used in a care of a condition selected from diabetes and asthma.

16. The method of claim 1 comprising achieving said correlating by setting equal a score of said first player to a score of said second player.

17. The method of claim 1 comprising achieving said correlating by conditioning a passage by said first player to a higher game level on proper game health behavior by said second player.

18. The method of claim 1 comprising achieving said correlating by rewarding said first player and said second player according to a Prisoner's Dilemma reward system.

19. A method of health education using a multi-player video game, comprising the steps of:
   a) setting a video game objective for each of a plurality of players, said objective comprising a game health-management goal for a health condition; and
   b) correlating a process of attaining said objective with game actions of each of said plurality of players, for encouraging communication about said health condition between said plurality of players.

20. The method of claim 19 wherein said health condition comprises a disease.

21. A multi-player video game system for providing health education and encouraging interplayer communication about a health condition, comprising:
   a) means for setting a first video game objective for a first player, and a second video game objective for a second player, said first objective comprising a first health-management goal for said health condition, said second objective comprising a second health-management goal for said health condition; and
   b) means for correlating a progress of said first player toward attaining said first objective with a progress of said second player toward attaining said second objective, for encouraging communication between said first player and said second player about said health condition.

22. The system of claim 21 wherein said health condition comprises diabetes.

23. The system of claim 21 wherein said health condition comprises asthma.

24. The system of claim 21 wherein said health condition is selected from cystic fibrosis, AIDS, sickle cell anemia, eneuresis, and cancer.

25. The system of claim 21 wherein said health condition is selected from dental disease and decay, eating disorders, improper nutrition, tobacco use, drug use and alcohol use.

26. The system of claim 21 further comprising:
 a) means for allowing said first player to manage a health of a first game character subject to said health condition; and
 b) means for allowing said second player to manage a health of a second game character subject to said health condition.

27. The system of claim 26 wherein:
 a) said health condition comprises diabetes; and
 b) said first health-management goal is selected from a group of ensuring that said first game character takes appropriate insulin doses, and ensuring that said first game character eats appropriate amounts of food, for maintaining a blood glucose level of said first game character in a desired range.

28. The system of claim 26 wherein:
 a) said health condition comprises asthma; and
 b) said first health-management goal is selected from a group of ensuring that said first game character avoids allergens, and ensuring that said first game character takes appropriate asthma medications, for maintaining a peak flow of said first game character in a desired range.

29. The system of claim 26 wherein said first health-management goal comprises controlling said character to respond to game challenges representative of said health condition.

30. The system of claim 21 wherein said first health-management goal comprises managing a health of a game body region affected by said health condition.

31. The system of claim 30 wherein said game body region is selected from mouth and cardiovascular regions.

32. The system of claim 21 further comprising means for asking said first player a question related to said health condition, wherein correctly answering said question by said first player advances said progress of said first player.

33. The system of claim 21 wherein said means for correlating said progress of said first player comprises means for making said progress of said first player and said progress of said second player depend on a set of common game resources.

34. The system of claim 33 wherein said set of common game resources comprises a resource used in a care of said health condition.

35. The system of claim 33 wherein said resource comprises a medical device used in a care of a condition selected from diabetes and asthma.

36. The system of claim 21 wherein said means for correlating said progress of said first player comprises means for setting equal a score of said first player to a score of said second player.

37. The system of claim 21 wherein said means for correlating said progress of said first player comprises means for conditioning a passage by said first player to a higher game level on proper game health behavior by said second player.

38. The system of claim 21 wherein said means for correlating said progress of said first player comprises means for rewarding said first player and said second player according to a Prisoner's Dilemma reward system.

* * * * *